US009825906B2

United States Patent
Wei (10) Patent No.: US 9,825,906 B2
(45) Date of Patent: Nov. 21, 2017

(54) SYSTEM AND METHOD FOR INTERCONNECTING LOCAL SYSTEMS AND CLOUD SYSTEMS TO PROVIDE SEAMLESS COMMUNICATIONS

(71) Applicant: Aviatrix Systems, Inc., Palo Alto, CA (US)

(72) Inventor: Xiaobo Sherry Wei, Palo Alto, CA (US)

(73) Assignee: Aviatrix Systems, Inc., Palo Alto, CA (US)

( * ) Notice: Subject to any disclaimer, the term of this patent is extended or adjusted under 35 U.S.C. 154(b) by 123 days.

(21) Appl. No.: 14/591,859

(22) Filed: Jan. 7, 2015

(65) Prior Publication Data
US 2015/0195363 A1 Jul. 9, 2015

Related U.S. Application Data

(60) Provisional application No. 61/925,221, filed on Jan. 9, 2014, provisional application No. 61/937,529, filed
(Continued)

(51) Int. Cl.
*H04L 29/12* (2006.01)

(52) U.S. Cl.
CPC ........ *H04L 61/2596* (2013.01); *H04L 61/103* (2013.01); *H04L 61/20* (2013.01);
(Continued)

(58) Field of Classification Search
CPC . H04L 61/20; H04L 61/2015; H04L 21/2023; H04L 61/203; H04L 61/2046;
(Continued)

(56) References Cited

U.S. PATENT DOCUMENTS

2013/0163473 A1\* 6/2013 An .................. H04L 41/0806
370/255

OTHER PUBLICATIONS

Author Unknown, VPN using the same address pool as network, pp. 1-3, May 26, 2014.\*
(Continued)

*Primary Examiner* — Christopher Crutchfield
(74) *Attorney, Agent, or Firm* — Rutan & Tucker LLP; William W. Schaal (57) ABSTRACT

A system with a local network and a set of remote networks is described herein. A subnet address range associated with the local network is subdivided into sub-segment address ranges. Each remote network is assigned a sub-segment address range for communicating with the local network. Each sub-segment address range is a smaller part of the original subnet range and each sub-segment range does not overlap with other sub-segment address ranges. Using an intermediate-local function device of the local network and intermediate-remote function devices of the remote networks, client stations in both the local and remote networks may seamlessly communicate using their native private addresses as destination addresses and without indirect address mapping. Further, the intermediate-local and the intermediate-remote function devices allow client stations in the local and remote networks to communicate without installation of corresponding agents or knowledge of the location of the client stations in separate physical networks.

21 Claims, 9 Drawing Sheets

Related U.S. Application Data on Feb. 8, 2014, provisional application No. 62/002,959, filed on May 26, 2014.

(52) U.S. Cl.
CPC ...... *H04L 61/6068* (2013.01); *H04L 61/2007* (2013.01); *H04L 61/2061* (2013.01); *H04L 61/6013* (2013.01); *H04L 61/6022* (2013.01)

(58) Field of Classification Search
CPC ............. H04L 61/2061; H04L 61/2069; H04L 61/2076; H04L 29/12207; H04L 29/12264; H04L 29/12292
See application file for complete search history.

(56) References Cited

OTHER PUBLICATIONS

Author Unknown, PenVPN Configuring Protected Point2Pint for OpenVPN Access Server, Feb. 19, 2012, pp. 1-4.*
Author Unknown, How VPN Works, as captured by the Internet Archive, www.archive.org on Sep. 18, 2010, pp. 1-33.*
Author Unknown, Cisco ASR 901S Series Aggregation Services Router Software Configuration Guide, pp. 1-17, Nov. 21, 2013.*
D. Fucitalo, Marc Grote, VPN with pool of statics addr, Sep. 27, 2011.*

* cited by examiner

SYSTEM AND METHOD FOR INTERCONNECTING LOCAL SYSTEMS AND CLOUD SYSTEMS TO PROVIDE SEAMLESS COMMUNICATIONS

RELATED MATTERS

This application claims the benefit of the earlier filing dates of U.S. provisional application No. 61/925,221, filed Jan. 9, 2014; U.S. provisional application No. 61/937,529 filed Feb. 8, 2014; and U.S. provisional application No. 62/002,959 filed May 26, 2014.

TECHNICAL FIELD

Embodiments of the present disclosure relate to a system and method that divides a subnet address range for a local network into multiple sub-segments. The multiple sub-segments may be used by corresponding remote networks in geographically separated locations to achieve seamless communications between the local and remote networks.

BACKGROUND

Over the last decade, there has been a substantial increase in the use and deployment of network enabled client stations. These client stations may join a Layer 2 local network in which the client stations operate on the same subnet (i.e., address range). Since client stations operate using the same subnet, communications between client stations may be performed using media access control (MAC) addresses. In particular, network devices within this Layer 2 local network may use Address Resolution Protocol (ARP) requests and responses to resolve a mapping between Internet Protocol (IP) addresses and MAC addresses for client stations. Based on this mapping, client stations may communicate with each other within the local network using MAC addresses.

In some situations, the local network described above may be communicatively coupled to one or more geographically remote networks such that client stations in the local network may communicate with client stations in these remote networks. In this configuration, the local network operates on a different subnet (i.e., address range) than the remote networks. Since the local and remote networks operate on different subnets, the combined network system created by these networks may be considered a Layer 3 network. As a Layer 3 network, client stations in each of the local and remote networks communicate using intermediate routing devices instead of directly using MAC addresses as with a Layer 2 network. Accordingly, the client stations on the local network and the remote networks are in different broadcast domains and may not efficiently transmit multicast or broadcast packets in this Layer 3 network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

Figure 1:
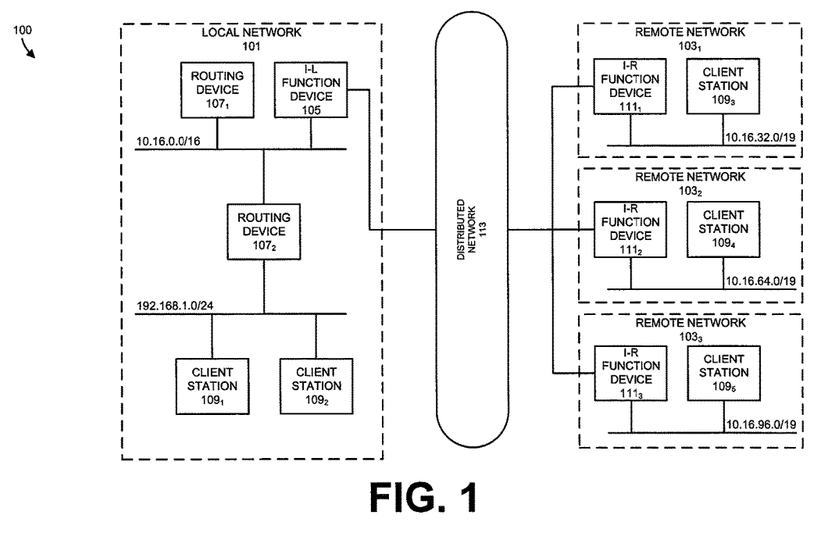
FIG. 1 shows a block diagram example of a network system, including a local network with an intermediate-local function device and a set of remote networks with respective intermediate-remote function devices, in accordance with one or more embodiments.

FIG. 1 shows an exemplary block diagram example of a system 100 in accordance with one or more embodiments. The system 100, as illustrated in FIG. 1, is a digital system that may include a local network 101 and a set of remote networks $103_1$-$103_3$. The local network 101 is communicatively coupled to the set of remote networks $103_1$-$103_3$ using a set of networking devices as will be described in more detail below. Although shown as including three remote networks $103_1$-$103_3$, in other embodiments, the system 100 may include any number of remote networks 103.

The local network 101 may include an intermediate-local function device 105, a set of routing devices $107_1$ and $107_2$, and a set of client stations $109_1$ and $109_2$. Similarly, the remote networks $103_1$-$103_3$ may include a respective intermediate-remote function device $111_1$-$111_3$ and a set of client stations $109_3$-$109_5$. As will be described in greater detail below, a subnet address range associated with the local network 101 may be subdivided into multiple sub-segment address ranges. Each remote network $103_1$-$103_3$ may be assigned one of the sub-segment address ranges for communicating with the local network 101. Each sub-segment address range is a smaller part of the original subnet address range of the local network 101 and each sub-segment address range does not overlap with any other sub-segment address range assigned to other remote networks $103_1$-$103_3$. Using the intermediate-local function device 105 and the intermediate-remote function devices $111_1$-$111_3$, the client stations $109_1$-$109_5$ in both the local network 101 and the remote networks $103_1$-$103_3$ may seamlessly communicate with each other using their native private Internet Protocol (IP) addresses as destination addresses and without indirect address mapping. Further, the intermediate-local function device 105 and the intermediate-remote function devices $111_1$-$111_3$ allow client stations $109_1$-$109_5$ in the local network 101 and the remote networks $103_1$-$103_3$ to communicate without use/installation of a corresponding software agent or knowledge of the location of the client stations $109_1$-$109_5$ in separate physical networks (e.g., the local network 101 and the remote networks $103_1$-$103_3$). Each component of the local network 101 and the remote networks $103_1$-$103_3$ will now be described by way of example. In other embodiments, the local network 101 and the remote networks $103_1$-$103_3$ may include more or less components than those shown and described herein.

Figure 2:
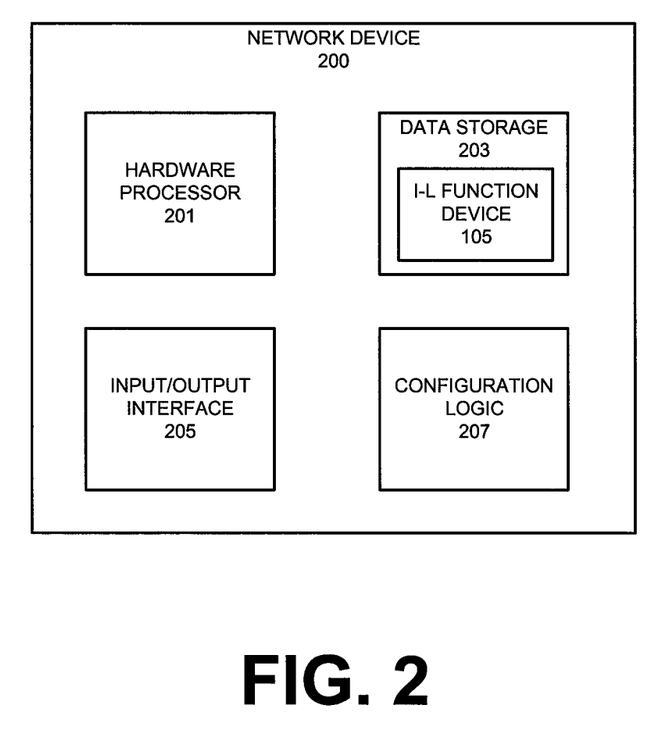
FIG. 2 shows an exemplary component diagram of a network device used to implement one or more components in the network system according to one embodiment.

The intermediate-local function device 105 handles all traffic destined to and received from the remote networks $103_1$-$103_3$, including the creation of one or more tunnels with the remote networks $103_1$-$103_3$ and encryption/decryption for these tunnels. In this fashion, the intermediate-local function device 105 functions as a Layer 2 bridge for communicating with the client stations $109_3$-$109_5$ in the remote networks $103_1$-$103_3$. In some embodiments, the intermediate-local function device 105 may be implemented by one or more physical and/or virtual devices. For example, the intermediate-local function device 105 may be implemented as one or more virtual devices running in a hypervisor environment on a network device. For example, FIG. 2 shows a component diagram of a network device 200 in which the intermediate-local function device 105 may be run within. As shown, the network device 200 comprises one or more of: a hardware processor 201, data storage 203, an input/output (I/O) interface 205, and device configuration logic 207. The network device 200 may be any network computing device, including a laptop computer, a desktop computer, a server, etc. Each of these components of the network device 200 will be described in further detail below.

In one embodiment, the data storage 203 is a distributed set of data storage components. The data storage 203 of the network device 200 may include a fast read-write memory for storing programs and data during operations, and a hierarchy of persistent memory, such as Read Only Memory (ROM), Erasable Programmable Read Only Memory (EPROM,) and/or Flash memory for example, for storing instructions and data needed for the startup and/or operation of the network device 200. For example, as shown in FIG. 2, the data storage 203 may include the intermediate-local function device 105 that may be executed by the hardware processor 201. As noted above, the intermediate-local function device 105 may be implemented as one or more virtual devices running in a hypervisor environment. In this embodiment, the data storage 203 may include the necessary components for virtualization, including hypervisor software components.

In one embodiment, the I/O interface 205 corresponds to one or more components used for communicating with other devices (e.g., the intermediate-remote function devices $111_1$-$111_3$ and/or the routing devices $107_1$ and $107_2$) via wired or wireless signals. The I/O interface 205 may include a wired network interface such as an IEEE 802.3 Ethernet interface and/or a wireless interface such as an IEEE 802.11 WiFi interface. The I/O interface 205 may facilitate communications with intermediate-remote function devices $111_1$-$111_3$, the routing devices $107_1$ and $107_2$, or other devices in the system 100 over corresponding wired or wireless connections.

In one embodiment, the hardware processor 201 is coupled to the data storage 203 and the I/O interface 205. The hardware processor 201 may be any processing device including, but not limited to a MIPS/ARM-class processor, an Intel-class processor (e.g., X86, Pentium, etc.), a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof. In some embodiments, the configuration logic 207 may be used for configuring parameters associated with the intermediate-local function device 105 and/or creating and configuring the intermediate-remote function devices $111_1$-$111_3$. For example, the device configuration logic 207 may be used for bridging/routing communications between client stations $109_1$ and $109_2$ in the local network 101 and client stations $109_3$-$109_5$ in the remote networks $103_1$-$103_3$.

Similar to the intermediate-local function device 105, the intermediate-remote function devices $111_1$-$111_3$ handle all traffic destined to and received from the local network 101. In particular, each intermediate-remote function device $111_1$-$111_3$ handles separate network traffic between a corresponding remote network $103_1$-$103_3$ and the local network 101, including encryption/decryption for tunnels between the intermediate-local function device 105 and the intermediate-remote function devices $111_1$-$111_3$. Each of the intermediate-remote function devices $111_1$-$111_3$ may be assigned a separate sub-segment address range based on the address range of the local network 101 as described above and as will be described in greater detail below. In some embodiments, each of the remote networks $103_1$-$103_3$ represent cloud computing environments on a network device that is geographically separated from the local network 101. For example, each of the intermediate-remote function devices $111_1$-$111_3$ may be implemented by one or more physical and/or virtual devices. Each of the intermediate-remote function devices $111_1$-$111_3$ may be implemented as one or more virtual devices running in a hypervisor environment on a network device, which is similar or identical to the network device 200 shown in FIG. 2.

The intermediate-local function device 105 may communicate with the intermediate-remote function devices $111_1$-$111_3$ over a distributed network 113 as shown in FIG. 1. The distributed network 113 may include any number of networking devices, including routers, switches, etc. In one embodiment, the distributed network 113 is the Internet.

The routing devices $107_1$ and $107_2$ may be any devices that may route data between components within the system 100. For instance, the routing devices $107_1$ and $107_2$ may route packets received from the client stations $109_3$-$109_5$ via the intermediate-remote function devices $111_1$-$111_3$ and the intermediate-local function device 105 to the client stations $109_1$ and $109_2$. Each of the routing devices $107_1$ and $107_2$ may include similar components as the network device 200. For example, each of the routing devices $107_1$ and $107_2$ may comprise hardware processor 201, data storage 203, input/output (I/O) interface 205, and device configuration logic 207 in a similar fashion as described above in relation to the network device 200. Although not shown, in some embodiments, the remote networks $103_1$-$103_3$ may include one or more routing devices 107 that operate between the intermediate-remote function devices $111_1$-$111_3$ and the client devices $109_3$-$109_5$, respectively.

In one embodiment, the client stations $109_1$-$109_5$ may be any wired or wireless electronic device capable of receiving and transmitting data over wired or wireless mediums. For example, the client stations $109_1$-$109_5$ may be one or more of a personal computer, a laptop computer, a netbook computer, a wireless music player, a portable communication device, a smart phone, a tablet computer, and a digital television. In one embodiment, the client stations $109_1$-$109_5$ are digital devices that include a hardware processor, memory hierarchy, and input/output (I/O) interfaces including a wired and/or wireless interface such as an IEEE 802.11 interface. In one embodiment, the configuration of the components within the client stations $109_1$-$109_5$ may be similar to those discussed above in relation to the network device 200. In other embodiments, the client stations $109_1$-$109_5$ may be implemented as one or more virtual devices running in a hypervisor environment on a network device.

Transmissions from the Local Network to the Remote Network(s)

Figure 3A:
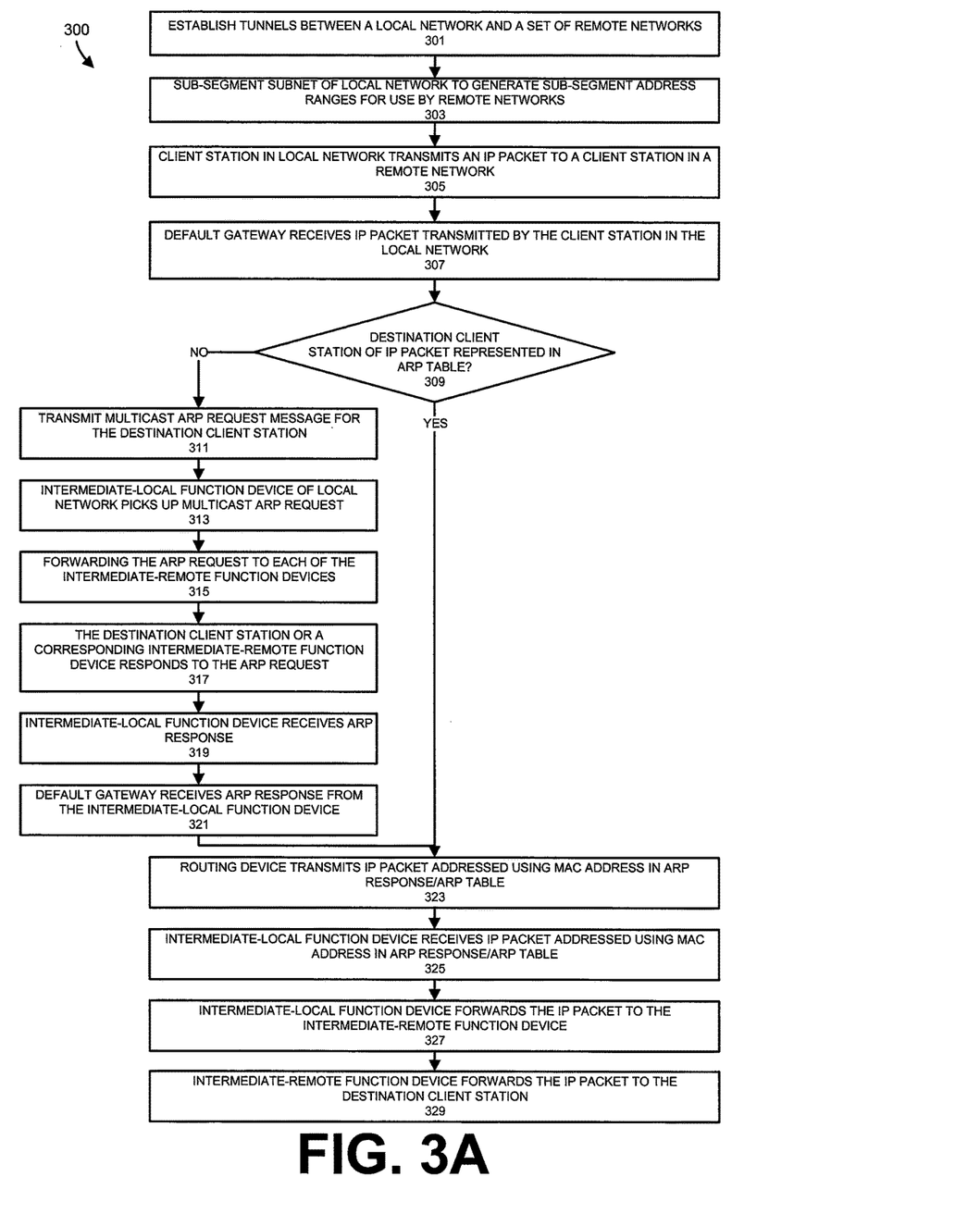
FIG. 3A shows an exemplary method for transmitting data from the local network to one or more of the remote networks via the intermediate-local function device and the intermediate-remote function devices according to one embodiment.

Turning now to FIG. 3A, a method 300 for transmitting data from the local network 101 to one or more of the remote networks $103_1$-$103_3$ will now be described. Although the method 300 will be described in relation to the example system 100 discussed above and shown in FIG. 1, in other embodiments the method 300 may be similarly performed for other network systems, including network systems with more or less remote networks 103. As will be discussed in greater detail below, the method 300 provides seamless communications between the client stations $109_1$ and $109_2$ in the local network 101 and the client stations $109_3$-$109_5$ in the remote networks $103_1$-$103_3$, respectively. In particular, the method 300 allows the client stations $109_1$ and $109_2$ in the local network 101 to transmit packets to the client stations $109_3$-$109_5$ in the remote networks $103_1$-$103_3$, respectively, via the intermediate-local function device 105 and the intermediate-remote function devices $111_1$-$111_3$ using native IP addresses of the client stations $109_1$-$109_5$ and without indirect address mapping. The operations of the method 300 may be performed by one or more of the components of the system 100. For example, one or more of the operations of the method 300 may be performed by the intermediate-local function device 105, one or more of the intermediate-remote function devices $111_1$-$111_3$, the routing devices $107_1$ and $107_2$, and/or the client stations $109_1$-$109_5$. Each operation of the method 300 will be described below by way of example.

Although the operations of the method 300 are shown and described in a particular order, in other embodiments the operations of the method 300 may be performed in a different order. For example, in some embodiments, two or more operations of the method 300 may be performed concurrently and/or during overlapping time periods.

Figure 4:
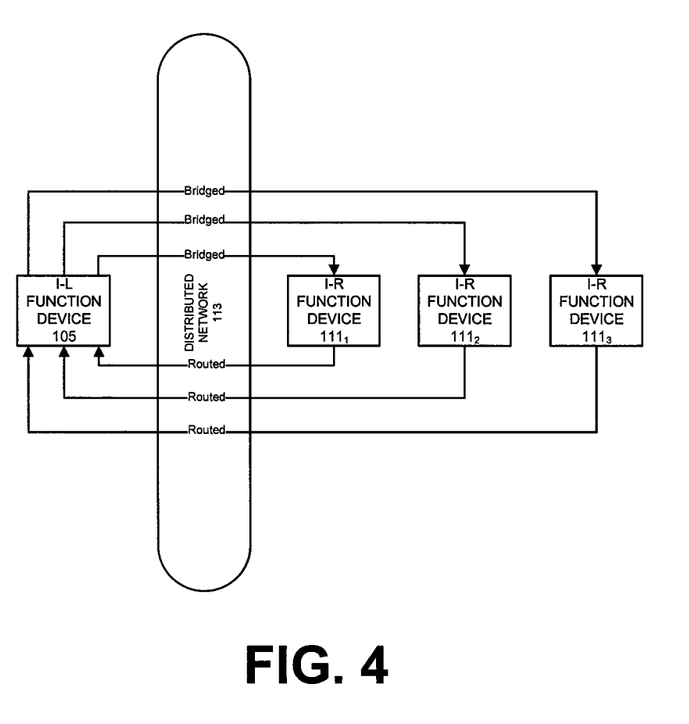
FIG. 4 shows exemplary bridged and routed tunnels established between the intermediate-local function device and the intermediate-remote function devices according to one embodiment.

In one embodiment, the method 300 may commence at operation 301 with the establishment of tunnels between the intermediate-local function device 105 in the local network 101 and each individual intermediate-remote function device $111_1$-$111_3$ in the remote networks $103_1$-$103_3$. In one embodiment, separate bridge and routing tunnels may be established between the intermediate-local function device 105 and each of the intermediate-remote function devices $111_1$-$111_3$. For instance, the intermediate-local function device 105 may establish six tunnels with the three intermediate-remote function devices $111_1$-$111_3$ shown in the example system 100 of FIG. 1. As shown in FIG. 4, these tunnels include (1) one bridged tunnel between the intermediate-local function device 105 and each of the intermediate-remote function devices $111_1$-$111_3$ for a total of three bridged tunnels and (2) one routed tunnel between the intermediate-local function device 105 and each of the intermediate-remote function devices $111_1$-$111_3$ for a total of three routed tunnels. Each of these bridged and routed tunnels may be secure tunnels with transit packets encrypted. Further, each of these tunnels may correspond to separate bridged and routed interfaces on the intermediate-local function device 105 and on each of the intermediate-remote function devices $111_1$-$111_3$. The bridged tunnels allow the communication of data between client stations 109 within the same subnet address range using Ethernet/MAC addressing while routing tunnels allow communication of data between client stations 109 within different subnet address ranges using IP addresses.

Figure 3B:
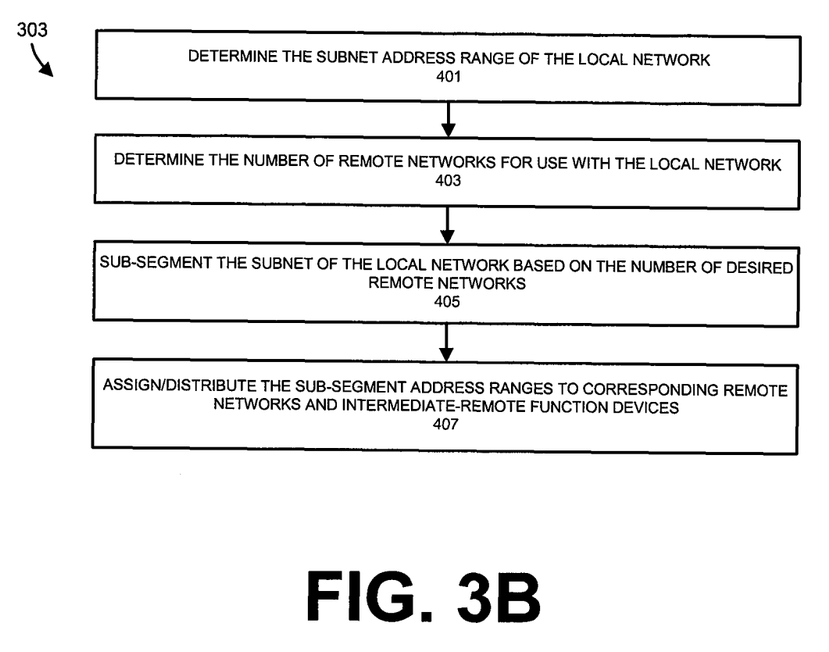
FIG. 3B shows exemplary sub-operations for sub-segmenting a subnet of the locate network to generate sub-segment address ranges for use by the remote networks according to one embodiment.
Figure 5:
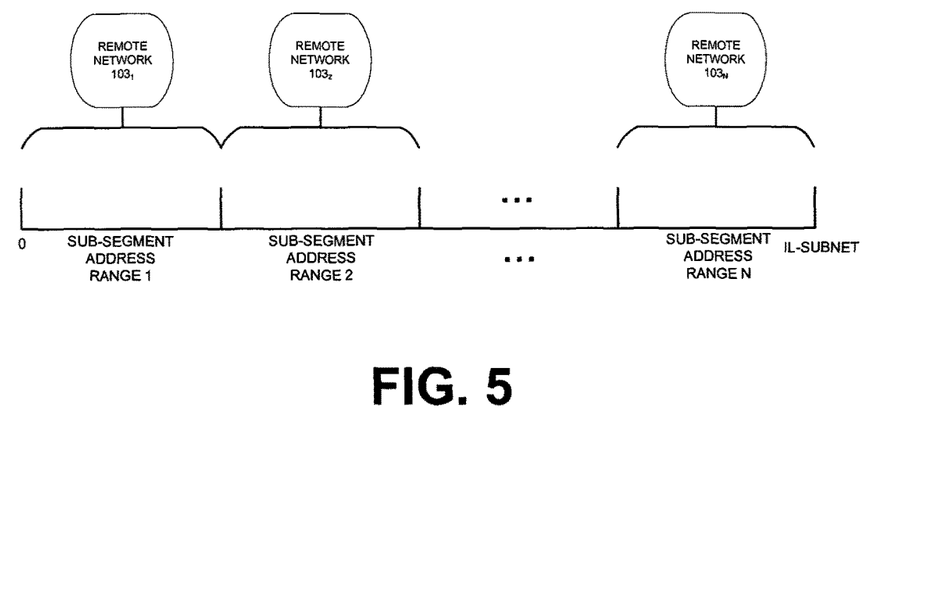
FIG. 5 shows exemplary sub-segmenting of the IL-subnet associated with the local network according to one embodiment.
Figure 6:
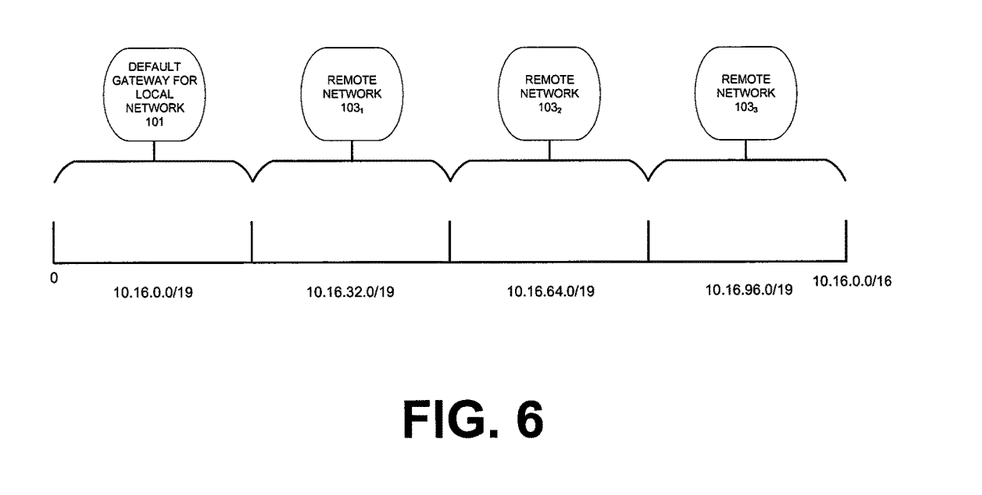
FIG. 6 shows exemplary sub-segmenting of the 10.16.0.0/16 subnet associated with the local network according to one embodiment.

At operation 303, a subnet address range of the local network 101 may be segmented into multiple sub-segments. As used herein, segmenting or sub-segmenting the subnet address range of the local network 101 is defined as splitting or otherwise dividing the available addresses assigned to the local network 101 into two or more sub-segment address ranges (i.e., multiple smaller subnets). These sub-segments may thereafter be assigned to remote networks 103. The methods and techniques used to segment the subnet address range of the local network 101 may vary as provided by way of example below. FIG. 3B shows sub-operations according to one embodiment that may be performed by operation 303. As shown in FIG. 3B, at sub-operation 401, the subnet address range for the local network 101 may be determined while at operation 403, the number of remote networks 103 for use with the local network 101 may be determined. The number of desired remote networks 103 may be selected at operation 403 by an administrator/user of the system 100. At sub-operation 405, the subnet of the local network 101 may be sub-segmented based on the number of remote networks 103 determined at operation 403. For example, as shown in FIG. 5, the subnet address range IL-subnet (corresponding to the local network 101) maybe split into N sub-segments that may be distributed to N remote networks $103_1$-$103_N$. As shown, the N sub-segment address ranges do not overlap and are each within the IL-subnet (i.e., the addresses ranges are between 0 and IL-Subnet). FIG. 6 shows the sub-segmentation in relation to the subnet 10.16.0.0/16 and the remote networks $103_1$-$103_3$. In this example, the subnet address range 10.16.0.0/16 is segmented into 10.16.0.0/19, 10.16.32.0/19, 10.16.64.0/19, and 10.16.96.0/19 sub-segment address ranges. The sub-segment address range 10.16.0.0/19 corresponds to the default gateway of the local network 101 (e.g., the local network 101 may have a default gateway of 10.16.0.1) and the address ranges 10.16.32.0/19, 10.16.64.0/19, and 10.16.96.0/19 correspond to the remote networks $103_1$-$103_3$ respectively as shown in FIG. 6. Although shown as being equal in size, in some embodiments the sub-segment address ranges may be of different sizes. For example, some sub-segment address ranges may have a mask length of 19 bits while others may have a sub-segment length of 18 or 20 bits. Accordingly, the sub-segment address ranges generated at operation 405 may vary in size.

Returning to FIG. 3B, the sub-segment address ranges generated at sub-operation 405 may be assigned/distributed to each of the remote networks 103 at operation 407. For example, in one embodiment, the assignment and distribution may include the instantiation/configuration of intermediate-remote function devices 111 for each remote network 103. Each of the intermediate-remote function devices 111 may thereafter manage the sub-segment address ranges assigned/distributed at operation 407.

As configured using the above described sub-segmented address ranges, the local network 101 is on the subnet 10.16.0.0/16 while the remote networks $103_1$-$103_3$ are on the subnets 10.16.32.0/19, 10.16.64.0/19, and 10.16.96.0/19, respectively. Accordingly, the local network 101 views the remote networks $103_1$-$103_3$ as being on the same subnet, since the subnet of the local network 101 is inclusive of the subnets of the remote networks $103_1$-$103_3$ (i.e., the subnets 10.16.32.0/19, 10.16.64.0/19, and 10.16.96.0/19 of the remote networks $103_1$-$103_3$ fall within the subnet 10.16.0.0/16 of the local network 101). Accordingly, since the local network 101 views the remote networks $103_1$-$103_3$ as being in the same subnet, the local network 101 may transmit packets to the remote networks $103_1$-$103_3$ using the bridging tunnels setup at operation 301 (i.e., using Ethernet/MAC addresses). In contrast, since the rest of the subnet (excluding 10.16.0.0/16) of the local network 101 does not fall within the range of the remote networks $103_1$-$103_3$ (i.e., the subnet 10.16.0.0/16 of the local network 101 does not fall within the subnets 10.16.32.0/19, 10.16.64.0/19, and 10.16.96.0/19 of the remote networks $103_1$-$103_3$), the remote networks $103_1$-$103_3$ must utilize the routing tunnels to communicate with the local network 101 using IP addresses. As will be described in further detail below, the intermediate-local function device 105 and the intermediate-remote function devices $111_1$-$111_3$ facilitate this hybrid bridge/routed network to create an overlay Layer 2 network system that allows the client stations $109_1$-$109_5$ to seamlessly communicate using native IP addresses of the client stations $109_1$-$109_5$ and without indirect address mapping.

In some embodiments, operations 301 and 303 may be performed during the initial setup of the system 100. Following initial performance of operations 301 and 303, client stations $109_1$-$109_5$ may continually communicate as described below without repeatedly performing operations 301 and 303. In some embodiments, operations 301 and 303 are automated based on inputs from an administrator regarding the number of remote networks 103 and desired size of each remote segment (each remote network size can be different).

Following segmentation of the local network 101 subnet address range at operation 303, the client station $109_1$ may transmit an IP packet to the client station 1093 at operation 305. The client station $109_1$ may include the private IP address of the destination client station $109_3$ in the transmitted IP packet. The client station $109_1$ may be completely outside the subnet of the default gateway of the local network 101 (i.e., the routing device $107_1$). For example, the client station $109_1$ may have an address of 192.168.1.5, which is outside the subnet 10.16.0.0/16 that is managed by the routing device $107_1$.

Since the client station $109_1$ and the client station $109_3$ are in different subnets (i.e., client station $109_1$ is in subnet 192.168.1.0/24 while client station $109_3$ is in subnet 10.16.32.0/19), the client station $109_1$ sends the IP packet to the default gateway (e.g., the routing device $107_1$). Through various intermediate network devices (e.g., the routing device $107_2$), at operation 307 the IP packet may arrive at the default gateway for the local network 101 (e.g., the routing device $107_1$). As noted above, the routing device $107_1$ manages the subnet 10.16.0.0/16. Since the client station $109_3$ is viewed by the routing device $107_1$ as being in the 10.16.0.0/16 subnet (i.e., the subnet 10.16.32.0/19 of the remote network $103_1$ is within the 10.16.0.0/16 subnet managed by the routing device $107_1$), the routing device $107_1$ believes that a bridging tunnel may be used for transferring the IP packet originally transmitted at operation 305. Accordingly, upon receipt of the IP packet, the routing device $107_1$ (i.e., the default gateway) may determine at operation 309 whether an entry exists for the client station $109_3$ in a forwarding table of the routing device $107_1$. The entry would include the Ethernet/MAC address of the client station $109_3$.

Upon determining that client station $109_3$ is not represented in the forwarding table, the routing device $107_1$ transmits a multicast address resolution protocol (ARP) request at operation 311. In this embodiment, the intermediate-local function device 105 may operate in promiscuous mode such that all packets are accepted by the device 105. Since the intermediate-local function device 105 operates in promiscuous mode, the ARP request generated by the routing device $107_1$ at operation 311 is picked up by the intermediate-local function device 105 at operation 313. Upon picking up the ARP request, the intermediate-local function device 105 forwards the ARP request to each of the intermediate-remote function devices $111_1$-$111_3$ at operation 315 since the ARP request is a multicast packet. The intermediate-local function device 105 may forward using the bridged tunnels setup at operation 301.

Since the intermediate-remote function device $111_1$ is the default router for 10.16.32.0/19, upon which the client station $109_3$ is located, the intermediate-remote function device $111_1$ forwards the ARP request to the client station $109_3$ on behalf of the routing device $107_1$. In contrast, the other intermediate-remote function devices $111_2$ and $111_3$ drop the ARP request since the client station $109_3$ is not located within their respective subnets. Upon receipt of the ARP request, the client station $109_3$ may respond to the ARP request at operation 317. The ARP response may include various pieces of data, including the Ethernet/MAC address of the client station $109_3$, which was requested by the routing device $107_1$.

In some embodiments, instead of forwarding the ARP request to the client station $109_3$, the intermediate-remote function device $111_1$ may respond on behalf of the client station $109_3$ at operation 317. In these embodiments, the ARP response may include the Ethernet/MAC address of the intermediate-remote function device $111_1$ instead of the client station $109_3$. By responding on behalf of the client station $109_3$, the intermediate-remote function device $111_1$ may ensure that the multicast ARP request is not dropped when the remote network $103_1$ does not support multicast messages. In another embodiment, the intermediate remote function device $111_1$ may change the source MAC address in the ARP request and then forward the ARP request. When ARP response comes back from the client station $109_3$, the destination MAC address in the ARP response may be replaced with the original source MAC address.

At operation 319, the ARP response packet, which originated from either the client station $109_3$ or the intermediate-remote function device $111_1$, may be received by the intermediate-local function device 105 over a routing tunnel established at operation 301. Since the intermediate-local function device 105 functions as a bridge and the ARP response was routed, the intermediate-local function device 105 will release the ARP response on the wire/connection between the intermediate-local function device 105 and the routing device $107_1$ such that the ARP response may be received at operation 321 by the routing device $107_1$, which manages the subnet of the local network 101.

Based on the ARP response received at operation 321, the routing device $107_1$ has the Ethernet/MAC address of what the routing device $107_1$ believes to be the client station $109_3$ and may add an ARP table entry for the client station $109_3$ based on this Ethernet/MAC address. However, as noted above, this Ethernet/MAC address may belong to either the client station $109_3$ or through a proxy response the Ethernet/MAC address may belong to the intermediate-remote function device $111_1$.

Either after receiving the ARP response at operation 321 or after determining at operation 309 that the client station $109_3$ is represented in the ARP table of the routing device $107_1$, the routing device $107_1$ transmits the original IP packet from the client station $109_1$ using the presumed address of the client station $109_3$. At operation 325, the intermediate-local function device 105, which is in promiscuous mode, picks up the IP packet on the wire/connection between the routing device $107_1$ and the intermediate-local function device 105.

Figure 7:
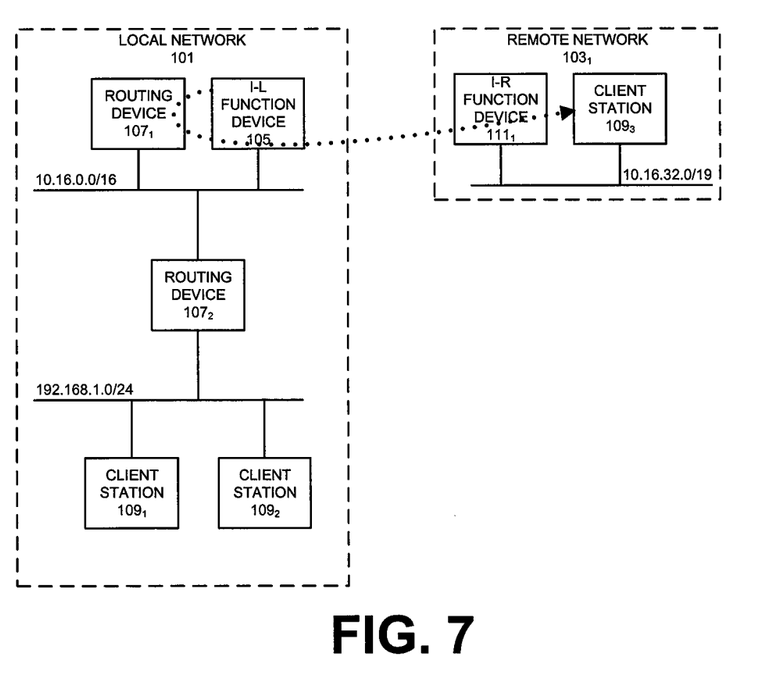
FIG. 7 shows an example in the forwarding of a packet from a routing device in the local network to a client station in a remote network via the intermediate-local function device and the intermediate-remote function device according to one embodiment.

At operation 327, the intermediate-local function device 105 may forward the IP packet along to the intermediate-remote function device $111_1$ as shown with the dotted line in FIG. 7. In one embodiment, the transmission at operation 327 is unicast on the bridge tunnel established between the intermediate-local function device 105 and the intermediate-remote function device $111_1$ at operation 301 using the Ethernet/MAC address received by the routing device $107_1$ at operation 321. The intermediate-local function device 105 may determine the correct bridge tunnel to use for transmission to the intermediate-remote function device $111_1$ based on the logical interface on which the original ARP response from the intermediate-remote function device $111_1$ was received or on the logical interface associated with the bridge tunnel to the intermediate-remote function device $111_1$. Upon receipt of the IP packet, the intermediate-remote function device $111_1$ may transmit the IP packet to the client station $109_3$ at operation 329.

Transmissions from a Remote Network to the Local Network

Figure 8:
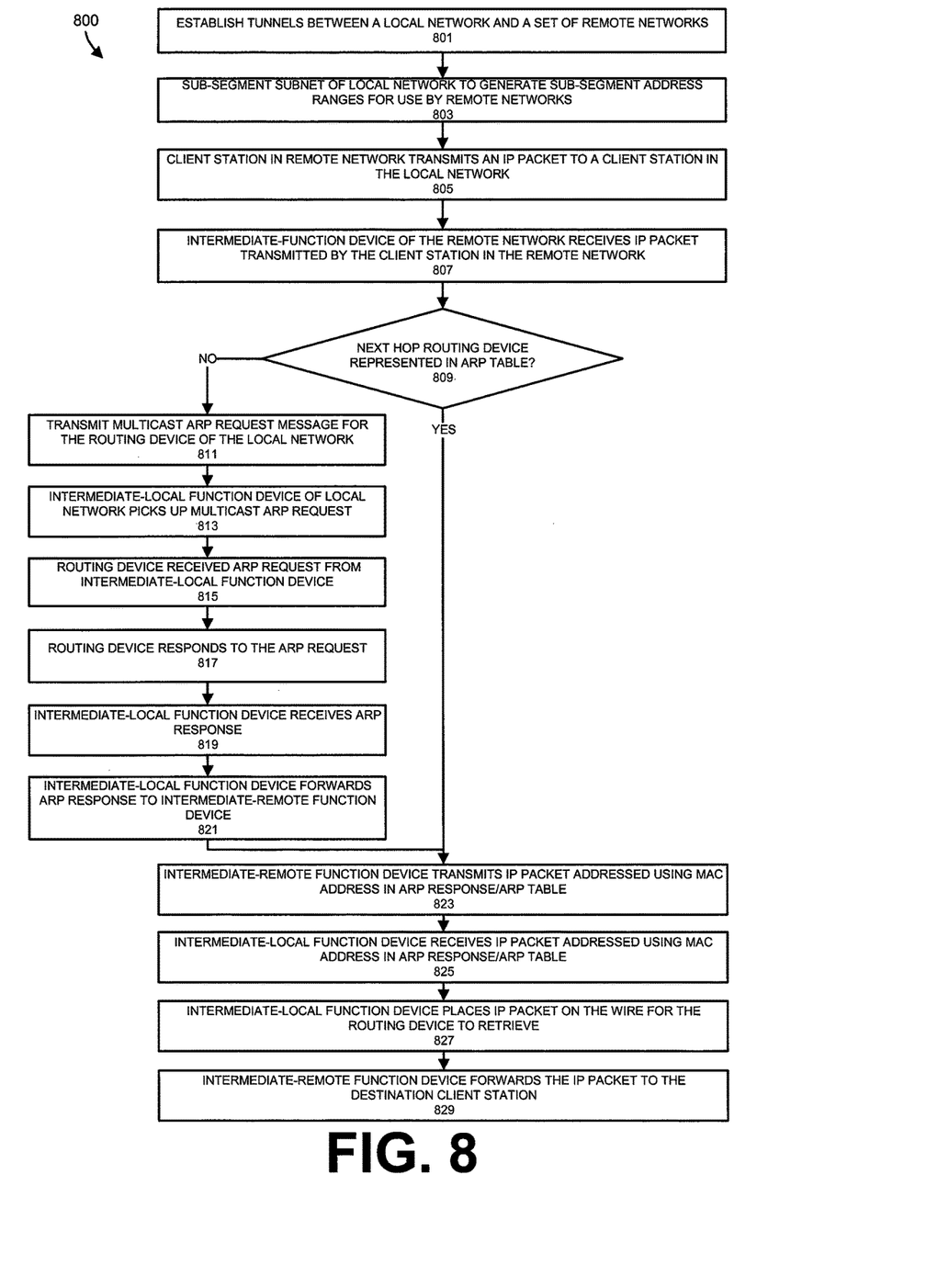
FIG. 8 shows an exemplary method for transmitting data from a remote network to the local networks via the intermediate-local function device and an intermediate-remote function device according to one embodiment.

Turning now to FIG. 8, a method 800 for transmitting data from the remote network $103_1$ to the local network 101 will now be described. Although the method 300 will be described in relation to the remote network $103_1$, in other embodiments the method 300 may be similarly performed for the other remote networks $103_2$ and $103_3$. Similar to the method 300, the method 800 provides seamless communications between the client stations $109_1$ and $109_2$ in the local network 101 and the client stations $109_3$-$109_5$ in the remote networks $103_1$-$103_3$. In particular, the method 800 allows the client station $109_3$ in the remote network $103_1$ to communicate with the client stations $109_1$ and $109_2$ in the local network 101 via the intermediate-local function device 105 and the intermediate-remote function device $111_1$ using native IP addresses of the client stations $109_1$-$109_3$ and without indirect address mapping. The operations of the method 800 may be performed by one or more of the components of the system 100. For example, one or more of the operations of the method 800 may be performed by the intermediate-local function device 105, the intermediate-remote function device $111_1$, the routing devices $107_1$ and $107_2$, and/or the client stations $109_1$ and $109_3$. Each operation of the method 800 will be described below by way of example.

Although the operations of the method 800 are shown and described in a particular order, in other embodiments the operations of the method 800 may be performed in a different order. For example, in some embodiments, two or more operations of the method 800 may be performed concurrently and/or during overlapping time periods.

Similar to the method 300, the method 800 may commence at operation 801 with the establishment of tunnels between the intermediate-local function device 105 in the local network 101 and each individual intermediate-remote function device $111_1$-$111_3$ in the remote networks $103_1$-$103_3$. As noted above, the tunnels may be secure tunnels and may include both bridging and routing tunnels between the intermediate-local function device 105 in the local network 101 and each individual intermediate-remote function device $111_1$-$111_3$ in the remote networks $103_1$-$103_3$ as shown in FIG. 4.

Again, similar to the method 300, at operation 803 in the method 800, a subnet address range of the local network 101 may be segmented into multiple sub-segments. The sub-segments may be non-overlapping and may be respectively assigned to separate remote networks $103_1$-$103_3$ as shown in FIG. 3B. For example, FIG. 6 shows the sub-segmentation in relation to the subnet 10.16.0.0/16 and the remote networks $103_1$-$103_3$. As described above, the subnet address range 10.16.0.0/16 is segmented into 10.16.0.0/19, 10.16.32.0/19, 10.16.64.0/19, and 10.16.96.0/19 sub-segment address ranges. The sub-segment address range 10.16.0.0/19 corresponds to an address range for the default gateway of the local network 101 (e.g., the local network 101 may have a default gateway of 10.16.0.1) and the address ranges 10.16.32.0/19, 10.16.64.0/19, and 10.16.96.0/19 correspond to the remote networks $103_1$-$103_3$ respectively as shown in FIG. 6.

In some embodiments, operations 801 and 803 may be performed during the initial setup of the system 100. Following initial performance of operations 801 and 803, the client stations $109_1$-$109_5$ may continually communicate through the transmission of multiple packets as described below without repeatedly performing operations 801 and 803. In some embodiments, operations 801 and 803 are automated based on inputs from an administrator regarding the number of remote networks 103.

Following segmentation of the local network 101 subnet address range, the client station $109_3$ may transmit an IP packet to the client station $109_1$ at operation 805. The client station $109_3$ may include the private IP address of the destination client station $109_1$ in the transmitted IP packet. The client station $109_3$ may be completely outside the subnet of the default gateway of the remote network $103_1$ (i.e., the intermediate-remote function device $111_1$). For example, the client station $109_3$ may have an address of 185.172.1.2, which is outside the subnet 10.16.32.0/19 that is managed by the intermediate-remote function device $111_1$.

Since the client station $109_1$ and the client station $109_3$ are in different subnets (i.e., the client station $109_1$ is in subnet 192.168.1.0/24 while client station $109_3$ is in subnet 10.16.32.0/19), the client station $109_3$ sends the IP packet to the default gateway (e.g., the intermediate-remote function device $111_1$). Through potentially various intermediate network devices, at operation 807 the IP packet may arrive at the default gateway for the remote network $103_1$ (e.g., the intermediate-remote function device $111_1$).

The intermediate-remote function device $111_1$ may determine that the routing device $107_1$ is the next hop in the network such that the IP packet to be transmitted to client station $109_1$ should be initially forwarded/routed to the routing device $107_1$. To perform this forwarding, the intermediate-remote function device $111_1$ may determine at operation 809 whether an entry exists for the routing device $107_1$ in a forwarding table of the intermediate-remote function device $111_1$. The entry would include the Ethernet/MAC address of the routing device $107_1$.

Upon determining that the routing device $107_1$ is not represented in the forwarding table, the intermediate-remote function device $111_1$ transmits a multicast address resolution protocol (ARP) request at operation 811 for the routing device $107_1$. The intermediate-local function device 105 may pick up the ARP request at operation 813. Upon picking up the multicast ARP request, the intermediate-local function device 105 places the ARP request on the wire/connection between the routing device $107_1$ and the intermediate-local function device $111_1$ such that the ARP request may be picked up by the routing device $107_1$ at operation 815.

Upon receipt of the ARP request, the routing device $107_1$ may transmit an ARP response at operation 817. The ARP response may include the Ethernet/MAC address of the routing device $107_1$, which will be used by the intermediate-remote function device $111_1$ for forwarding the IP packet to the routing device $107_1$. The ARP response may be received by the intermediate-local function device 105 at operation 819 and may forward the ARP response to the intermediate-remote function device $111_1$ at operation 821. The intermediate-remote function device $111_1$ may use this ARP response to determine the Ethernet/MAC address of the routing device $107_1$. In one embodiment, the intermediate-remote function device $111_1$ may generate an entry in a forwarding table for the routing device $107_1$ based on the determined Ethernet/MAC address of the routing device $107_1$.

Either after receiving the ARP response at operation 821 or after determining at operation 809 that the routing device $107_1$ is represented in the ARP table of the intermediate-remote function device $111_1$, the intermediate-remote function device $111_1$ transmits the original IP packet at operation 823 using the determined address of the routing device $107_1$. The intermediate-remote function device $111_1$ receives the IP packet at operation 825 on a logical interface associated with the routed tunnel between the intermediate-remote function device $111_1$ and the intermediate-local function device 105.

At operation 827, the intermediate-local function device 105 may place the IP packet on the wire for retrieval by the routing device $107_1$. The routing device may thereafter forward the IP packet to the destination client station $109_1$ at operation 829. In some embodiments, the IP packet may reach the client station $109_1$ from the routing device $107_1$ via one or more other network elements (e.g., the routing device $107_2$).

As described above, the methods 300 and 800 shown in FIG. 3A and FIG. 8, respectively, provide for efficient data transmissions between client stations 109 on geographically separated networks. Specifically, using the intermediate-local function device 105 and the intermediate-remote function devices $111_1$-$111_3$, the client stations $109_1$-$109_5$ in both the local network 101 and the remote networks $103_1$-$103_3$ may seamlessly communicate with each other using their native private Internet Protocol (IP) addresses as destination addresses and without indirect address mapping. Further, the intermediate-local function device 105 and the intermediate-remote function devices $111_1$-$111_3$ allow client stations $109_1$-$109_5$ in the local network 101 and the remote networks $103_1$-$103_3$ to communicate without use/installation of a corresponding software agent or knowledge of the location of the client stations $109_1$-$109_5$ in separate physical networks (e.g., the local network 101 and the remote networks $103_1$-$103_3$).

Although described in relation to sub-segmenting a subnet of the local network 101 and assigning these sub-segment address ranges to the remote networks $103_1$-$103_3$, in other embodiments a pool of IP addresses from the subnet of the local network 101 may be reserved and recorded for each remote network $103_1$-$103_3$. In one embodiment, each intermediate-remote function device $111_1$-$111_3$ takes on one of the IP addresses from a respective pool of addresses. The intermediate-remote function devices $111_1$-$111_3$ may bind one of the IP addresses in a respective pool with a client station $109_3$-$109_5$ in the remote networks $103_1$-$103_3$. When client stations $109_1$ and $109_2$ in the local network 101 need to communicate with a client station $109_3$-$109_5$ in the remote networks $103_1$-$103_3$, the client stations $109_1$ and $109_2$ use the IP address bound to the client station $109_3$-$109_5$ in the remote network $103_1$-$103_3$. When the intermediate-remote function devices $111_1$-$111_3$ receive packets destined for this bonded address, the intermediate-remote function devices $111_1$-$111_3$ forward the packets to the respective client station $109_3$-$109_5$. Conversely, when a client station $109_3$-$109_5$ in the remote networks $103_1$-$103_3$ transmits a packet to client stations $109_1$ and $109_2$ in the local network, the intermediate-remote function devices $111_1$-$111_3$ may operate as a network address translation (NAT) router to forward the packet to the intermediate-local function device 105.

In addition to address binding, the intermediate-remote function devices $111_1$-$111_3$ may use their own reserved IP addresses to service binding with any client station $109_3$-$109_5$ inside the remote networks $103_1$-$103_3$. For example, if the client station $109_1$ transmits a packet to the client station $109_3$ on transmission control protocol (TCP) port 80, the intermediate-remote function device $111_1$ may bind TCP port 80 to a custom port on its own reserved IP address. In addition to address binding and port binding, the client stations $109_1$ and $109_2$ can use a virtual private network (VPN) mechanism (e.g., OpenVPN) to log into the intermediate-remote function devices $111_1$-$111_3$ as a landing pad. Once logged in, the client stations $109_1$ and $109_2$ may access the client stations $109_3$-$109_5$ in their native network address.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for facilitating communications between client devices in geographically separated networks, comprising:

receiving, by a default gateway in a local network, a packet from an origin client device in the local network, the packet includes a destination address of a destination client device in a remote network of a number of remote networks, wherein a subnet address range assigned to the local network is sub-segmented based on the number of remote networks connected with the local network over an intermediate network and each sub-segment address range is assigned as a network address range for a correspond remote network of the number of remote networks;

upon locating a media access control (MAC) address of the destination client device in an address resolution protocol (ARP) table of the default gateway, forwarding the packet to the destination client device via an intermediate-local function device and an intermediate-remote function device on the remote network using the located MAC address of the destination client device, wherein the intermediate-remote function device manages the sub-segment address ranges for the remote network and the intermediate-local function device in the local network manages the subnet address range assigned to the local network; and upon failing to locate a MAC address of the destination client device in the ARP table of the default gateway, the default gateway transmits a multicast ARP request to the number of remote networks.

2. The method of claim 1, wherein the number of remote networks corresponds to a plurality of remote networks.

3. The method of claim 2, further comprising: establishing tunnels between the intermediate-local function device and each of the intermediate-remote function devices of the plurality of remote networks.

4. The method of claim 3, wherein the tunnels include:
a separate bridging tunnel between the intermediate-local function device and each of the intermediate-remote function devices, wherein the bridging tunnels facilitate transmissions from the intermediate-local function device to the intermediate-remote function devices; and
a separate routing tunnel between the intermediate-local function device and each of the intermediate-remote function devices, wherein the routing tunnels facilitate transmissions from the intermediate-remote function devices to the intermediate-local function device.

5. The method of claim 4, further comprising:
forwarding, by the intermediate-local function device, an ARP request to each of the intermediate-remote function devices using corresponding bridging tunnels; and
in response to receiving the ARP request, the intermediate-remote function device, which manages the remote network on which the destination client device is located, routes an ARP response that includes a MAC address of the intermediate-remote function device to the default gateway via the intermediate-local function device.

6. The method of claim 5, further comprising:
forwarding, by the default gateway, the packet from the origin client device to the destination client device via the intermediate-local function device and the intermediate-remote function device, which manages the remote network on which the destination client device is located, using the MAC address of the intermediate-remote function device as the destination address for the packet.

7. The method of claim 4, wherein the routing tunnel is a secure tunnel, and the intermediate-local function device and the intermediate-remote function device perform encryption and decryption on packets passing through the routing tunnels.

8. The method of claim 4, further comprising: configuring the default gateway of the local network as a default gateway for a plurality of intermediate-remote function devices.

9. The method of claim 1 further comprising:
receiving an ARP response based on the multicast ARP request, the ARP response includes a MAC address of the intermediate-remote function device for use in subsequent transmissions of packets to the destination client device.

10. A network device, comprising:
at least one hardware processor; and
a data storage communicatively coupled to the at least hardware processor, the data storage being configured to:
receive a packet from an origin client device in a local network, the packet includes a destination address of a destination client device in a remote network of a plurality of remote networks, wherein the subnet address range of the local network is segmented based on the plurality of remote networks connected with the local network over an intermediate network and a first segmented address range being assigned to an intermediate-remote function device located in one of the plurality of remote networks, wherein the intermediate-remote function device manages the first segmented address range in remote network and the intermediate-local function device in the local network manages the subnet address range assigned to the local network;
upon locating a media access control (MAC) address of the destination client device in an address resolution protocol (ARP) table accessible by the network device, forwarding the packet to the destination client device via an intermediate-local function device and an intermediate-remote function device on the remote network using the located MAC address of the destination client device; and
upon failing to locate a MAC address of the destination client device in the ARP table of the default gateway, transmit a multicast ARP request to the remote networks.

11. The network device of claim 10 operating with the intermediate-local function device to:
establish tunnels between the intermediate-local function device and each of the intermediate-remote function devices of the remote networks.

12. The network device of claim 11, wherein the tunnels include:
a separate bridging tunnel between the intermediate-local function device and each of the intermediate-remote function devices, wherein the bridging tunnels facilitate transmissions from the intermediate-local function device to the intermediate-remote function devices; and
a separate routing tunnel between the intermediate-local function device and each of the intermediate-remote function devices, wherein the routing tunnels facilitate transmissions from the intermediate-remote function devices to the intermediate-local function device.

13. The network device of claim 12, wherein the routing tunnel is a secure tunnel and the intermediate-local function device and the intermediate-remote function device perform encryption and decryption on packets passing through the routing tunnel.

14. The network device of claim 10 further comprising:
receiving an ARP response based on the multicast ARP request, the ARP response includes a MAC address of the intermediate-remote function device on behalf of the destination client device for use in subsequent transmissions of packets to the destination client device.

15. A non-transitory computer readable medium comprising instructions which, when executed by one or more hardware processors in a network device, cause the one or more network devices to:
upon a media access control (MAC) address of the destination client device being located in an address resolution protocol (ARP) table of a default gateway that analyzed a packet from an origin client device in the local network, where the packet includes a destination address of a destination client device in a remote network of a plurality of remote networks and a subnet address range assigned to the local network is sub-segmented based on the plurality of remote networks connected with the local network over an intermediate network and each sub-segment address range is assigned to an intermediate-remote function device located in one of the plurality of remote networks, forwarding the packet to the destination client device via the intermediate-local function device and the first intermediate-remote function device of the remote network using the located MAC address of the destination client device, wherein a first intermediate-remote function device manages the assigned sub-segment address range for the remote network of the plurality of remote networks and an intermediate-local function device in the local network manages the subnet address range assigned to the local network; and
upon failing to locate a MAC address of the destination client device in the ARP table of the default gateway, the default gateway transmits a multicast ARP request to the plurality of remote networks.

16. The non-transitory computer readable medium of claim 15, which includes further instructions which, when executed by the one or more hardware processors in the network device, cause the network device to:
establish tunnels between the intermediate-local function device and each of the intermediate-remote function devices including the first intermediate-remote function device of the remote network.

17. The non-transitory computer readable medium of claim 16, wherein the tunnels include:
a separate bridging tunnel between the intermediate-local function device and each of the intermediate-remote function devices, wherein the bridging tunnels facilitate transmissions from the intermediate-local function device to the intermediate-remote function devices; and
a separate routing tunnel between the intermediate-local function device and each of the intermediate-remote function devices, wherein the routing tunnels facilitate transmissions from the intermediate-remote function devices to the intermediate-local function device.

18. The non-transitory computer readable medium of claim 17, which includes further instructions which, when executed by the one or more hardware processors in the network device, cause the network device to:
configure the default gateway of the local network as a default gateway for the intermediate-remote function devices.

19. The non-transitory computer readable medium of claim 16, wherein at least one of the tunnels is a secure tunnel, and the intermediate-local function device and the intermediate-remote function device perform encryption and decryption on packets passing through the tunnel.

20. The non-transitory computer readable medium of claim 15, which includes further instructions which, when executed by the one or more hardware processors in the network device, cause the network device to:
- forward, by the first intermediate-local function device, an ARP request to each of the intermediate-remote function devices using corresponding bridging tunnels; and
- in response to receiving the ARP request, the first intermediate-remote function device, which manages the remote network on which the destination client device is located, routes an ARP response that includes a MAC address of the first intermediate-remote function device to the default gateway via the intermediate-local function device.

21. The non-transitory computer readable medium of claim 20, which includes further instructions which, when executed by the one or more hardware processors in the network device, cause the network device to:
- forward, by the default gateway, the packet from the origin client device to the destination client device via the intermediate-local function device and the intermediate-remote function device, which manages the remote network on which the destination client device is located, using the MAC address of the intermediate-remote function device as the destination address for the packet.

* * * * *